United States Patent [19]

Kaiser

[11] 4,194,630
[45] Mar. 25, 1980

[54] PAPERBOARD CORNER PROTECTIVE DEVICE

[75] Inventor: Thomas J. Kaiser, St. Cloud, Minn.

[73] Assignee: Champion International Corporation, Stamford, Conn.

[21] Appl. No.: 972,654

[22] Filed: Dec. 26, 1978

[51] Int. Cl.² .................... B65D 81/14; B65D 85/48
[52] U.S. Cl. .................................. 206/586; 229/22; 229/DIG. 1
[58] Field of Search .......................... 206/453, 586; 229/34 HW, DIG. 1, 22; 248/345.1

[56] References Cited

U.S. PATENT DOCUMENTS

| | | | |
|---|---|---|---|
| 2,476,197 | 7/1949 | Kincaid | 206/586 |
| 2,509,468 | 5/1950 | Anderson, Jr. | 206/586 X |
| 2,562,655 | 7/1951 | Belanger | 206/592 X |
| 2,885,139 | 5/1959 | Werner et al. | 206/586 |
| 3,151,832 | 10/1964 | Doll | 248/345.1 |
| 4,127,192 | 11/1978 | Card | 229/DIG. 1 X |

Primary Examiner—Steven E. Lipman
Attorney, Agent, or Firm—Evelyn M. Sommer

[57] ABSTRACT

A one-piece flat paperboard blank is erected to form a device to protect the corners of packaged articles, the device being re-usable and fastened by a releasable locking tab. The blank comprises a series of four triangular panels and four rectangular panels, with a rectangular panel positioned between each pair of triangular panels.

14 Claims, 4 Drawing Figures

PAPERBOARD CORNER PROTECTIVE DEVICE

BACKGROUND OF THE INVENTION

The present invention relates to the protection of articles packed in containers and more particularly to a cardboard protector for the corners of articles which are packaged in cartons or other containers.

At the present time there are many methods utilized to protect articles within their packages. Such articles may be delicate or fragile and yet they may be dropped, bumped or otherwise mishandled.

There have been many materials used to cushion articles, for example, wood shavings, plastic foam particles, crushed newspapers and plastic films with air bubbles. However, these materials are not well adapted to protect the corners of articles, especially square corners, for example, the square corners of furniture, windows, table tops, cabinet doors, etc.

It is also known that the corners of articles may be protected by strips or pieces of cardboard. However, the location of such strips or pieces and their connection with the article have generally depended upon the skill of the packer and whether he taped, stapled or otherwise fastened the cardboard to the article.

SUMMARY OF THE INVENTION

In accordance with the present invention a paperboard corner protective device is provided which is erected and fastened from a unitary one-piece paperboard blank. Preferably the paperboard is corrugated paperboard in which a corrugated layer is held between, and glued to, two layers of paperboard. Alternatively, other types of paperboard or carton materials may be utilized, such as flat sheets of foamed styrene plastic resin.

The blank comprises a series of four triangularly shaped panels and four rectangularly shaped panels. The first rectangular panel is positioned with fold lines connecting it to the first and second triangular panels and with a free inside edge and a free outside edge. Similarly, the perimeter of the second rectangular panel consists of fold lines connected to the second and third triangular panel and free inside and outside edges; the perimeter of the third rectangular panel consists of fold lines connecting it to the third and fourth triangular panels and inside and outside free edges; and the fourth rectangular panel has a fold line connecting it to the fourth triangular panel, a free inside and a free outside edge and a free edge parallel to its fold line. One free edge of the fourth rectangular panel forms a gap with the free inside edge of the first triangular panel. The inside edges of the rectangular panel form an inside opening at the center of the blank and the triangular panels each have an outside free edge which forms part of the exterior perimeter of the blank. The first and third triangular panels have interlocking means, preferably an opening in the first triangular panel, and a tab which is extendable from the third triangular panel.

OBJECTIVES AND FEATURES OF THE INVENTION

It is an objective of the present invention to provide a protective device to protect the corners of articles which are packaged, which protective device is constructed of cardboard so as to be economical to manufacture and yet of sufficient strength and resiliency to provide protection against damage by dropping, bumping or other mishandling of the carton or other container.

It is a further objective of the present invention to provide such a corner protective device which may be shipped in flat form to the customer performing the packaging operation and may be readily erected by unskilled labor without using tools.

It is another objective of the present invention to provide such a corner protective device which may be manufactured in an economical manner as a single one-piece unitary die cut cardboard blank having fold lines (crease lines) and cut lines.

It is also an objective of the present invention to provide such a corner protective device which may be easily erected from flat cardboard blanks and locked in its erected state by an integral tab so that other locking means, such as tape or glue, is not required.

It is yet a further objective of the present invention to provide such a corner protective device which provides a double layer of corrugated cardboard between the article corner and its container.

It is still another objective of the present invention to provide such a corner protective device which, after being used, may readily and simply be disassembled and laid flat for storage, shipment and later re-use.

It is a feature of the present invention to provide a blank for a paperboard device and the device which fits upon and protects the corners of packaged articles.

The panels of the unitary one-piece blank include first, second, third and fourth triangular panels each have an outside free edge and the first triangular panel having a second free edge. The blank also includes first, second, third and fourth rectangular panels each having an inside free edge and an outside free edge, the inside free edges forming a central opening of said blank. The first rectangular panel is joined by respective fold lines to the first and second triangular panels; the second rectangular panel is joined by respective fold lines to the second and third triangular panels; the third rectangular panel is joined by respective fold lines to the third and fourth triangular panels; and the fourth rectangular panel is joined to the fourth triangular panel by a fold line having a free edge which forms a gap with the second free edge of the first triangular panel.

It is a further feature of the present invention to provide such a blank which further includes interlocking means on the first and third triangular panels to removably lock the first and third panels together. In one embodiment of the present invention the interlocking means comprises an opening in the first triangular panel and a tab on said third triangular panel.

BRIEF DESCRIPTION OF THE DRAWINGS

Other objectives of the present invention will be apparent from the following detailed description which provides the inventor's best mode of practicing the invention, which detailed description should be taken in conjunction with the accompanying drawings, wherein like numerals designate like parts.

In the drawings.

DETAILED DESCRIPTION OF THE INVENTION

Figure 1:
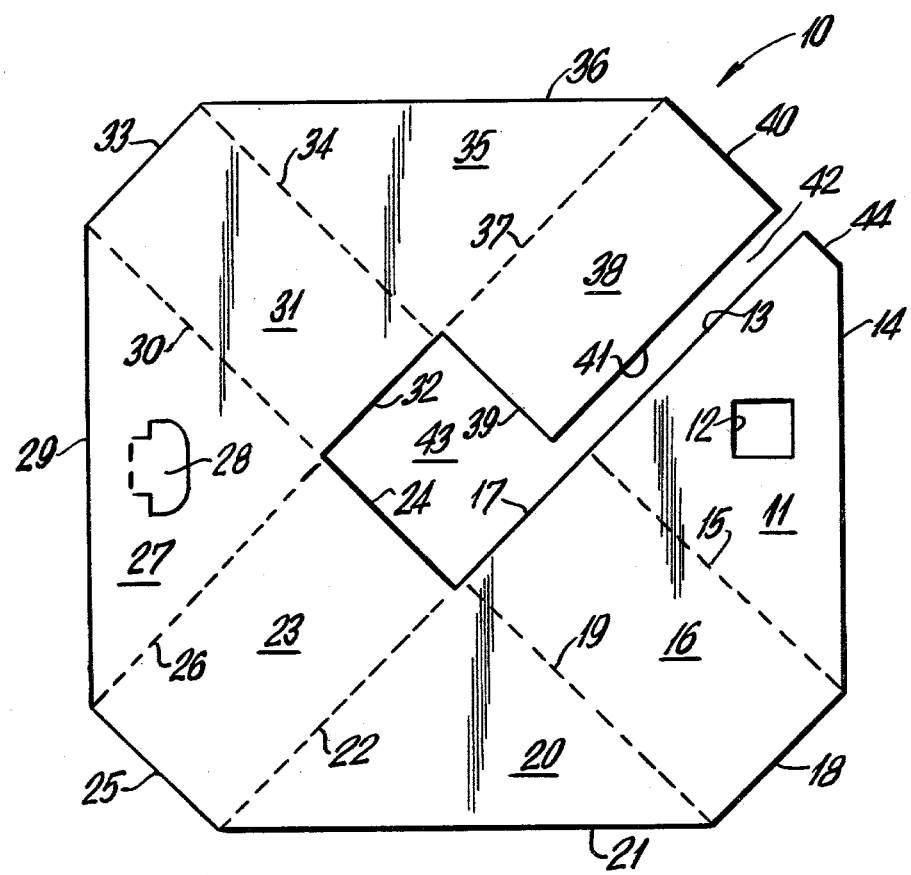
FIG. 1 is a top plan view of the blank from which the single cell corner protective device of the present invention is formed.

The paperboard unitary one-piece blank 10 from which the corner protective device of the present invention is formed is shown, in its first embodiment, in FIG. 1. As shown in FIG. 1 the blank 10 may be defined by a connected series of triangular panels and rectangular panels.

The first triangular panel 11 has an inside free edge 13, an outside free edge 14, a fold line 15 and a truncated exterior free edge 44. An opening 12, preferably rectangular in shape, provides a locking means for the triangular panel 11.

The first rectangular panel 16 is connected to the first triangular panel 11 by its fold line 15. Panel 16 has a fold line 19, parallel to the fold line 15, an interior free edge 17 and an exterior free edge 18, both free edges being perpendicular to the fold line 15. The second triangular panel 20 is connected to rectangular panel 16 by its fold line 19. The second triangular panel 20 has an exterior edge 21 and a second fold line 22 which is perpendicular to its fold line 19.

The second rectangular panel 23 is connected to the second triangular panel 20 by the fold line 22 and has a fold line 26 parallel to the fold line 22. The second rectangular panel 23 has an interior free edge 24 and exterior free edge 25, both of which are perpendicular to the fold lines 22 and 26. The third triangular panel 27 is connected to the second rectangular panel 22 by the fold line 26. A second fold line 30 of panel 27 is perpendicular to its fold line 27. The third triangular panel 27 has a free edge 29 and a fastening means 28, preferably a die-cut extendable tab.

The third rectangular panel 31 is connected to the third triangular panel 27 by the fold line 30. The third rectangular panel 31 has a second fold line 34 parallel to the fold line 30. Rectangular panel 31 has a parallel interior free edge 32 and an exterior free edge 33.

The fourth triangular panel 35 is connected to the rectangular panel 31 by the fold line 34 and has a second fold line 37 perpendicular to the fold line 34. The fourth triangular panel 35 has a free edge 36. The fourth rectangular panel 38 is connected to the fourth triangular 35 by the fold line 37 and has an interior free edge 39 and an exterior free edge 40 parallel and opposite to the free edge 39. The rectangular panel 38 has a free edge 41 parallel to its fold line 37. The free edge 41 forms a gap 42 between it and the free edge 13 of the first triangular panel 11. An interior rectangular opening 43 is formed by the interior free edges 17,24,32 and 39 of the rectangular panels.

Although the fastening means of the blank shown in FIG. 1 comprises an opening 12 and a tab 28, alternatively other types of removable fastening means such as certain adhesives or tape may be used to removably fasten the first triangular panel 11 to the third triangular panel 27.

Figure 2:
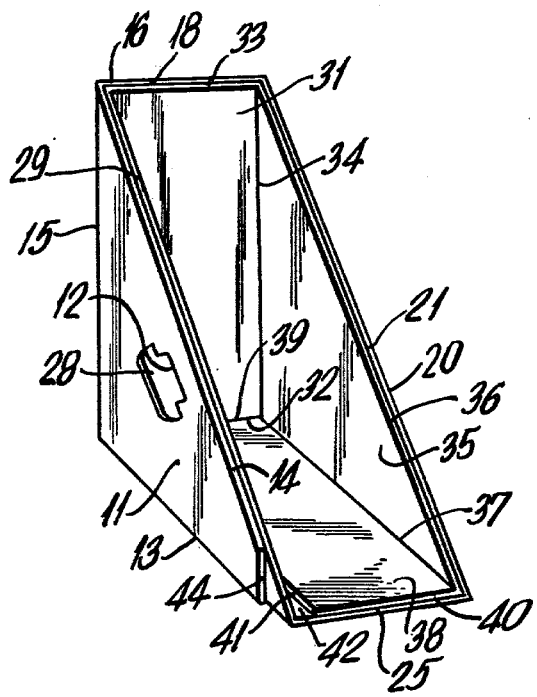
FIG. 2 is a perspective view showing the single cell corner protective device erected from the blank of FIG. 1.

To erect the corner device of the present invention, the user folds the first triangular panel 11 at 90° to the flat blank 10 along fold line 15. Then he proceeds to fold, at 90°, each of the subsequent fold lines 19, 22, 26, 30, 34 and 37. He then inserts the tab 28 into the opening 12 to removably fasten together the first panel 11 and the third panel 27. The erected corner protective device is shown in FIG. 2.

Figure 3:
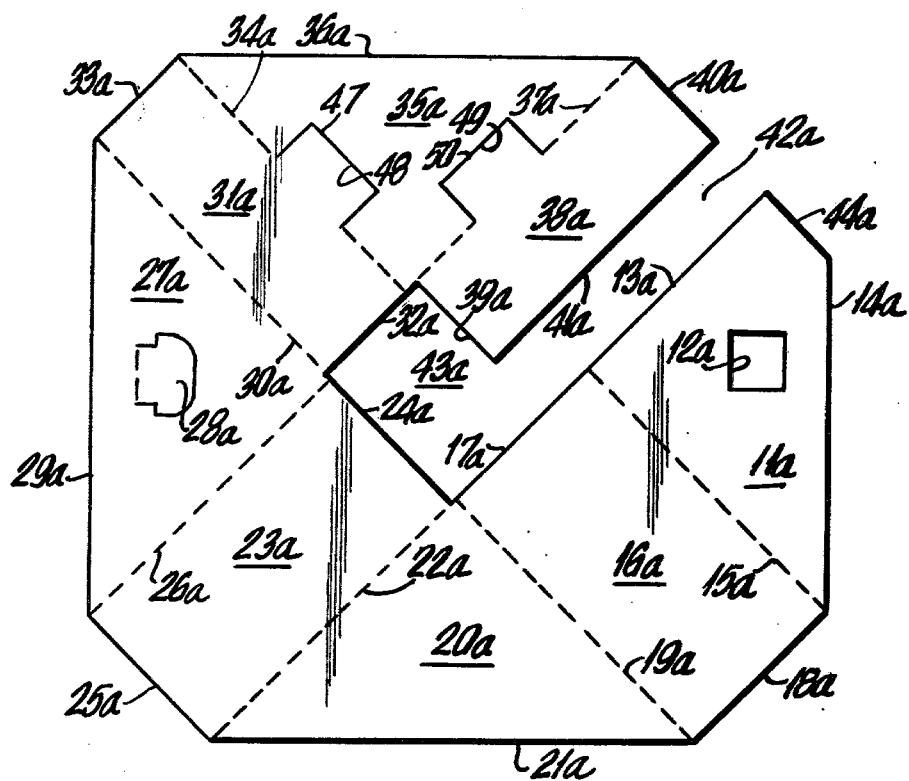
FIG. 3 is a top plan view of another embodiment of the present invention showing a double-cell corner protective device.
Figure 4:
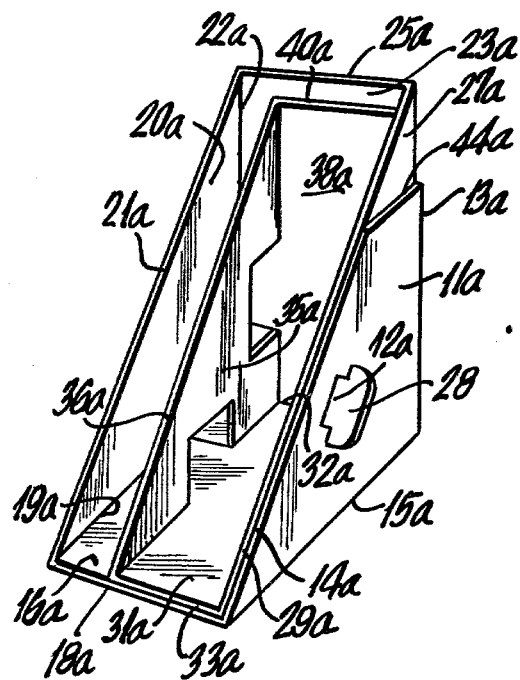
FIG. 4 is a perspective view showing the corner protective device erected from the blank of FIG. 3.

An alternative embodiment, having two cells, is shown in FIGS. 3 and 4. In the alternative embodiment illustrated in FIGS. 3 and 4 each of the panels, free edges and fold lines which correspond to the panels, free edges and fold lines of the embodiment shown in FIGS. 1 and 2 have been labeled with the same number but with the addition of the suffix "a". For example, the exterior free edge 14a of the first panel 11a, shown in FIGS. 3 and 4, corresponds to the free edge 14 of the first panel 11 shown in FIGS. 1 and 2. The major differences between the blank shown in FIG. 1 and the blank shown in FIG. 3 are that the fold lines joining the fourth triangular panel 35a to the rectangular panels 31a and 38a are not continuous and the width dimension of the fourth rectangular panel (the length of the free edges 33a and 32a) is shorter than the blank of FIG. 1.

As shown in FIG. 3, the fold line joining the fourth triangular panel 35a to the third rectangular panel 31a is divided into two portions 45 and 46, those portions 45 and 46 being discontinuous and providing between them a space for a three-sided free edge rectangular tab 27. Similarly, the fold line between the fourth triangular panel 35a has two discontinuous portions 48 and 49 with a space between them, providing for a rectangular tab 50. Tab 50 has three free edges and a connected non-folded and non-severed edge which is continuous to the rectangular panel 38. When the blank 10a of FIG. 3 is folded, as shown in FIG. 4, the tabs 47 and 50 provide the means to space the triangular panel 35a from the triangular panel 20a, thereby providing a corner protector having two cells. In the blank of FIG. 3 a dash line indicates a regular crease and the dash line with intervening crosses between each dash indicates a line of cut and crease, which cut-and-crease lines are fold lines and not severed lines.

What is claimed is:

1. A blank which may be erected and removably fastened to form a paperboard device to fit upon and protect the corners of packaged articles, said blank comprising, as panels of a unitary one-piece blank;
    (a) first, second, third and fourth triangular panels (11, 20, 27, 35) each having an outside free edge (14, 21, 29, 36) and said first triangular panel having a second free edge (13);
    (b) first, second, third and fourth rectangular panels (16, 23, 31, 38) each having an inside free edge (17, 24, 32, 39) and an outside free edge (18, 25, 33, 40), said inside free edges forming a central opening of said blank;
    (c) said first rectangular panel (16) being joined by respective fold lines (15, 19) to said first and second triangular panels (11, 20), said second rectangular panel (23) being joined by respective fold lines (22, 26) to said second and third triangular panels (20,27), said third rectangular panel (31) being joined by respective fold lines (30, 34) to said third and fourth triangular panels (27, 35); said fourth rectangular panel (38) being joined to said fourth triangular panel (35) by a fold line (34); said fourth rectangular panel (38) having a free edge (41) which forms a gap (42) with said second free edge (13) of said first triangular panel (11).

2. A blank as in claim 1 wherein said first, second, third and fourth triangular portions are all equilateral triangles.

3. A blank as claimed in claim 1 and further including interlocking means (12, 28) on said first and third triangular panels (11, 27) to removably lock said first and third panels together.

4. A blank as claimed in claim 3 wherein said interlocking means comprises an opening in said first triangular panel and a tab on said third triangular panel.

5. A blank as in claim 4 wherein said opening in said first triangular portion is a square opening.

6. A blank for a paperboard corner protective device comprising, as portions of a unitary one-piece blank (10):
   (a) a first substantially triangular panel (11) having releasable fastener means (12) and having a perimeter defined by an inner free edge (12), an outer free edge (14) and a first fold line (15);
   (b) a rectangular panel (16) joined along said first fold line (15) to said first triangular panel (11) and having a perimeter defined by an inner free edge (17), an outer free edge (18), said first fold line (15) and a second fold line (19);
   (c) a second substantially triangular panel (20) whose perimeter is defined by said second fold line (19), an outer free edge (21) and a third fold line (22);
   (d) a second rectangular panel (23) joined along said third fold line (22) to said second triangular panel (2) and having a perimeter defined by an inner free edge (24), an outer free edge (25), said third fold line (22) and a fifth fold line (26);
   (e) a third substantially triangular panel (27) having second releasable fastener means (28) to cooperate with said first fastener means (12) in releasably fastening the erected carton, the perimeter of said third triangular panel being defined by said fifth fold line (26), an outer free edge (29) and a sixth fold line (30);
   (f) a third rectangular panel (31) joined along a sixth fold line (30) to said third triangular panel (27) and having a perimeter defined by an inner free edge (32), an outer free edge (33), said sixth fold line (30) and a seventh fold line (34);
   (g) a fourth substantially triangular panel (35), its perimeter being defined by said seventh fold line (34), an outer free edge (36) and an eighth fold line (37);
   (h) a fourth rectangular panel (38) joined along said eighth fold line (37) to said fourth triangular panel (35) and having a perimeter defined by an inner free edge (39), an outer free edge (40), and a free edge (41) which forms a gap (42) with said inner free edge (13) of said first triangular panel;
   (i) wherein said inner free edges (17, 24, 32, 39) of said fourth rectangular panels form a central opening in said blank.

7. A blank as in claim 6 wherein said first, second, third and fourth triangular panels are all right-sided triangles.

8. A blank as in claim 6 wherein said fastening means in said first triangular panels is an opening through said panel.

9. A blank as in claim 8 wherein said opening in said first triangular panel is a square opening.

10. A paperboard device to fit upon and protect the corners of packaged articles, said device being erected from connected panels of a unitary one-piece blank; said device comprising:
    (a) first, second, third and fourth triangular panels (11, 20, 27, 35) each having an outside free edge (14, 21, 29, 36) and said first triangular panel having a second free edge (13);
    (b) first, second, third and fourth rectangular panels (16, 23, 31, 38) each having an inside free edge (17, 24, 32, 39) and an outside free edge (18, 25, 33, 40);
    (c) said first rectangular panel (16) being joined by respective right-angled fold lines (15, 19) to said first and second triangular panels (11, 20), said second rectangular panel (23) being joined by respective right-angled fold lines (22,26) to said second and third triangular panels (29,27), said third rectangular panel (31) being joined by respective right-angled fold lines (30, 34) to said third and fourth triangular panels (27, 35); said fourth rectangular panel (38) being joined to said fourth triangular panel (35) by a right-angled fold line (34); said fourth rectangular panel (38) having a free edge (41).

11. A device as in claim 10 wherein said first, second, third and fourth triangular portions are all right-angle triangles.

12. A device as claimed in claim 10 and further including interlocking means (12, 28) on said first and third triangular panels (11, 27) which locks said first and third panels together.

13. A device as claimed in claim 12 wherein said interlocking means comprises an opening in said first triangular panel and a tab on said third triangular panel which is fitted through said opening.

14. A device as in claim 13 wherein said opening in said first triangular portion is a square opening.

* * * * *